US006628883B2

United States Patent
Wyatt et al.

(10) Patent No.: US 6,628,883 B2
(45) Date of Patent: Sep. 30, 2003

(54) SILICA GLASS COMPOSITION WITH LASING PROPERTIES, AN OPTICAL WAVEGUIDE AND A METHOD OF AMPLIFYING OPTICAL SIGNALS

(75) Inventors: Richard Wyatt, Wodbridge (GB); Robert M. Percival, Ipswich (GB)

(73) Assignee: British Telecommunications public limited company, a corporation of England, London (GB)

( * ) Notice: Subject to any disclaimer, the term of this patent is extended or adjusted under 35 U.S.C. 154(b) by 69 days.

(21) Appl. No.: 09/805,379

(22) Filed: Mar. 14, 2001

(65) Prior Publication Data
US 2002/0021882 A1 Feb. 21, 2002

(30) Foreign Application Priority Data

Mar. 30, 2000 (EP) .............................................. 00302694

(51) Int. Cl.⁷ .............................. G02B 6/00; H04B 10/12
(52) U.S. Cl. .................... 385/142; 385/141; 359/341.1; 359/341.3

(58) Field of Search ................................. 385/141, 142; 359/341.1, 341.2, 341.3

(56) References Cited

U.S. PATENT DOCUMENTS

| 5,617,244 A | * | 4/1997 | Percival et al. ........... 359/341.5 |
| 5,651,019 A | * | 7/1997 | Goldberg et al. ............. 372/68 |
| 6,288,835 B1 | * | 9/2001 | Nilsson et al. ........... 359/341.3 |

* cited by examiner

Primary Examiner—Robert H. Kim
Assistant Examiner—Michael H Caley
(74) Attorney, Agent, or Firm—Nixon & Vanderhye, PC

(57) ABSTRACT

A thulium doped silica based glass capable of supporting lasing activity including $Tm^{3+}$ as a lasing species disposed in a host composition, including oxides of germanium, silicon and tantalum. The preferred concentration of silicon in the host composition being between 15–25 weight percent. The preferred concentration of germanium in the host composition being between 0.1–1 weight percent. The preferred concentration of tantalum in the host composition is greater than 15 weight percent. The preferred concentration of thulium ions being in the range of 500–1000 parts per million by weight.

26 Claims, 3 Drawing Sheets

Figure 1:
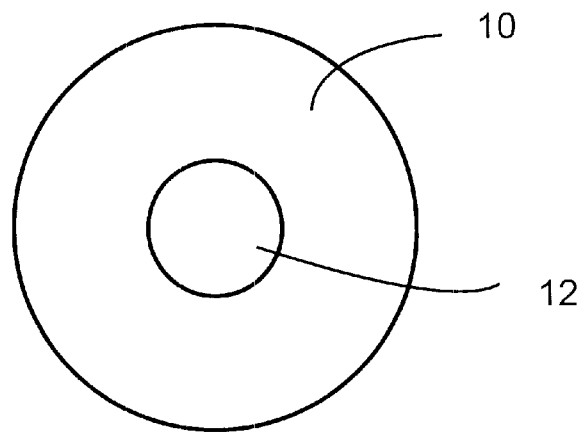

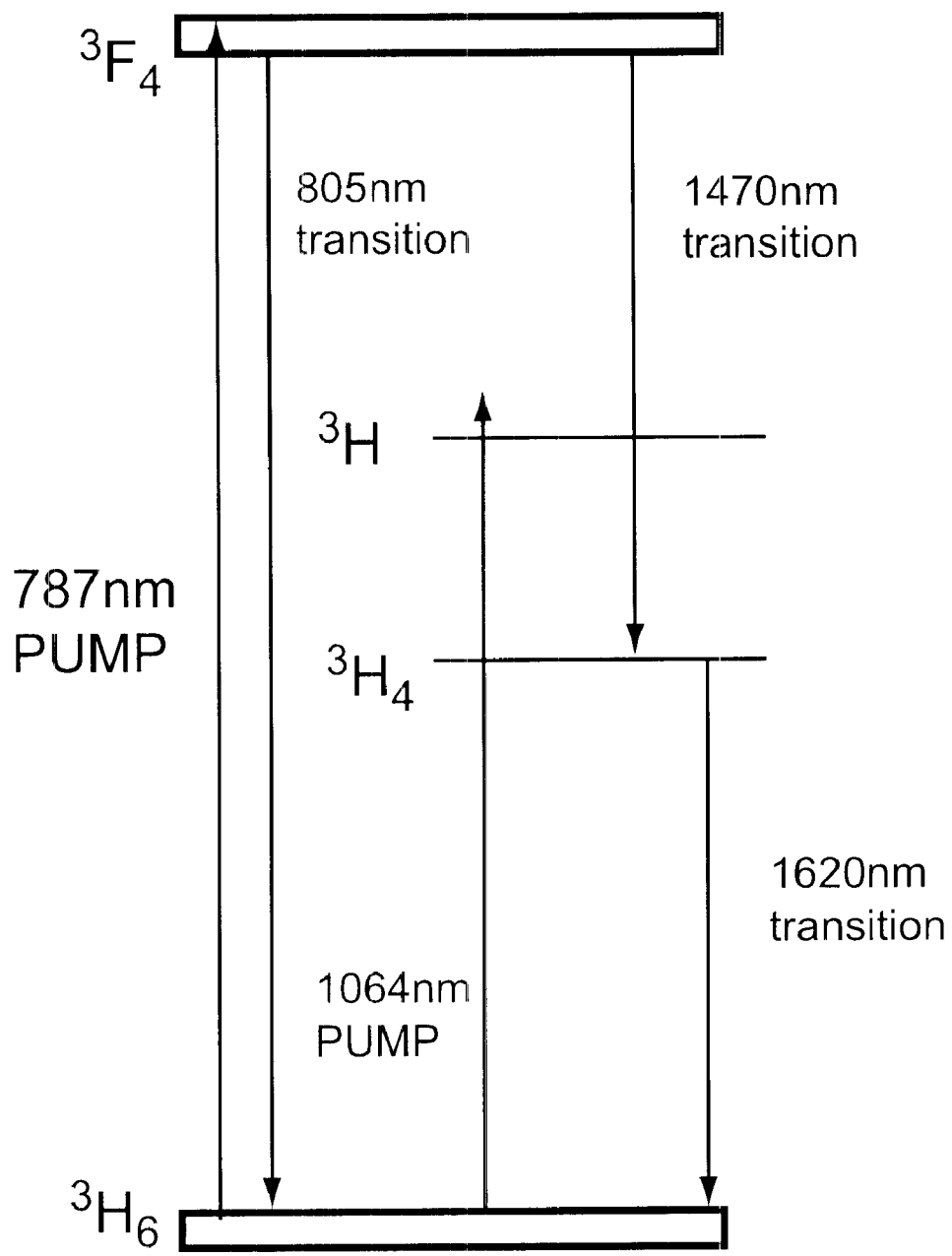
Fig. 3  Energy Level diagram for thulium

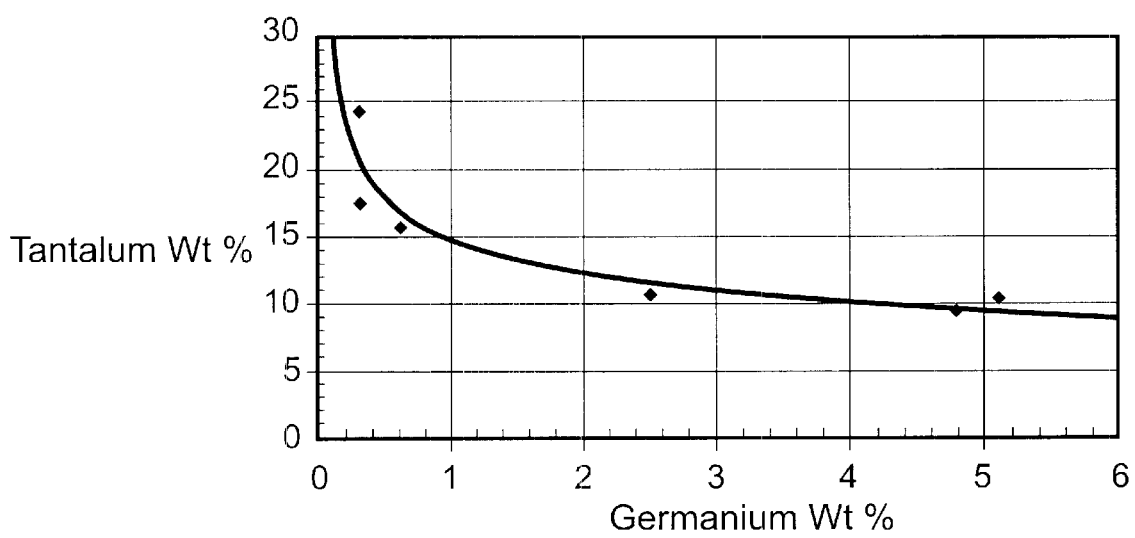
Fig. 4  Variation in Tantalum incorporation into glass with Germanium concentration

SILICA GLASS COMPOSITION WITH LASING PROPERTIES, AN OPTICAL WAVEGUIDE AND A METHOD OF AMPLIFYING OPTICAL SIGNALS

The present invention relates to a silica glass composition and, more specifically, it relates to a silica glass composition, in which the lasing species is thulium, eg. the ion $Tm^{3+}$. The invention has application in the field of waveguides.

Currently one strategy for increasing the amount of data transmitted across a telecommunications network is wavelength division multiplexing, WDM. In this scheme each wavelength channel is typically assigned a frequency slot with a bandwidth of 100 GHz (0.8 nm) in which to operate, and a large number of these channels are then multiplexed together and sent over a single transmission fibre. For transmission systems of less than 100 km the range of wavelengths over which signals can be transmitted extends from around 1430 to 1680 nm. In other words this range is only limited by the variation in the basic transmission properties of the optical fibre medium. However for systems of more than 100 km the attenuation in the optical fibre becomes significant such that the signal needs to be periodically boosted using an optical amplifier. Since the amplifier of choice for current systems is based on erbium doped silica fibre which has a bandwidth of about 30–40 nm this leads to strict limitations in the number of channels that can be effectively multiplexed onto a single fibre. Although some amplifier designs do allow the gain bandwidth to be increased by about a factor of 2 they are much less reliable due to the much higher component count, and are typically very costly. In any case, the 80 nm achieved with increased bandwidth amplifiers still only represents a small fraction of the optical fibres available bandwidth.

In order to increase the bandwidth of photonic amplifiers, rare earth elements other than erbium have been looked at. Thulium is one such rare earth element that has recently been the subject of some investigations.

W. S. Brocklesby, J. E. Townsend, D. J. B. Brinck, & R. S. Brown "Non-radiative Relaxation in Ta-doped Silica Fibre", Opt. Mats, Vol 3. pp205–208, 1994 describe silica glasses doped with the $Tm^{3+}$ ion at a doping concentration of approximately 75 parts per million (ppm). Some of the properties thulium doped tantalosilicate fibres, thulium doped germanosilicate and thulium doped aluminosilicate fibres have been investigated. In particular Brocklesby et al have observed that the fluorescence decay components in thulium doped tantalosilicate glasses are longer than those in thulium doped germanosilicate or thulium doped aluminosilicate fibres. Although, the addition of tantalum to the silica glass would appear to increase the fluorescence decay time in the thulium doped tantalosilicate fibre, the fibre suffers large losses which rule out its use as an optical amplifying medium.

The present invention seeks to provide to provide a thulium doped fibre having increased fluorescence decay times and reduced loss (i.e reduced attenuation of optical signals).

The invention, which is more closely defined by the claims 1–25, is based on the surprising discovery that the presence of germanium in low concentrations in a thulium doped tantalosilicate glass improves the efficiency of the glass, because it decreases the attenuation of optical signals.

Figure 2:
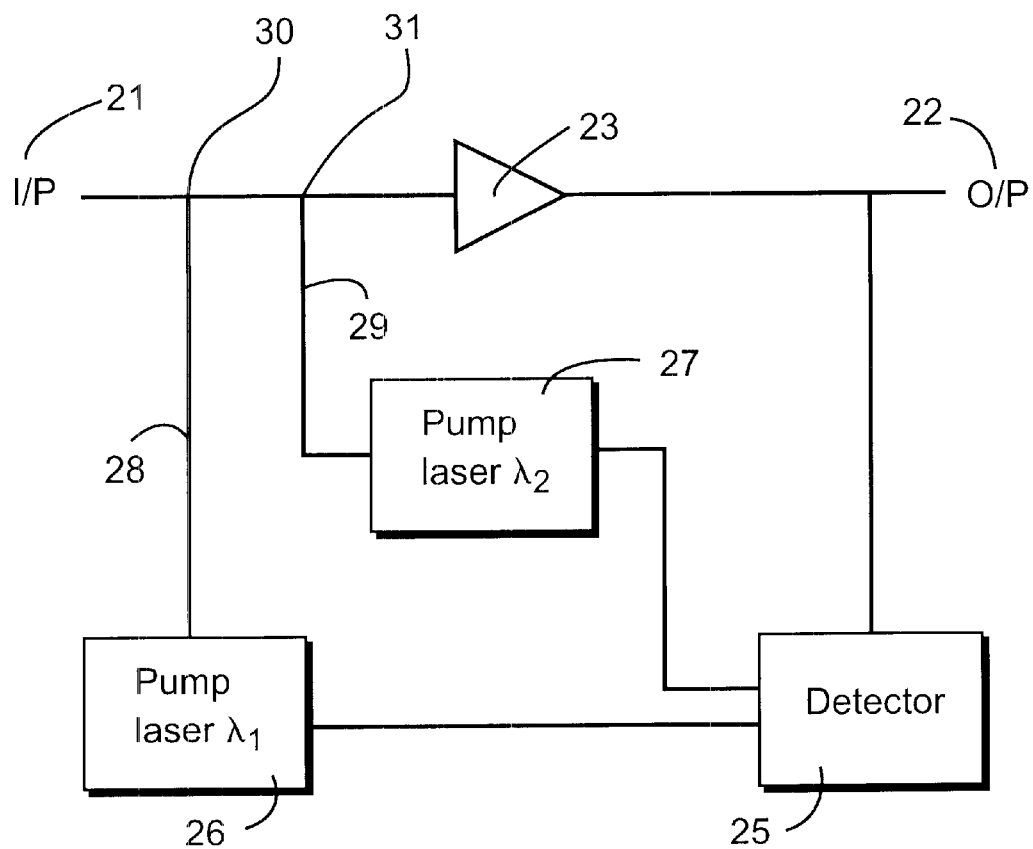

In order that the invention may be more fully understood embodiments thereof will now be described by way of example, reference being made to the accompanying drawings in which:

FIG. 1: shows a fibre made by the MCVD process and having a core including the glass of the present invention;

FIG. 2: shows an amplifier including an optical medium of the present invention;

FIG. 3: shows an energy level diagram for thulium;

FIG. 4: shows a graph illustrating the variation in tantalum incorporation into glass with germanium concentration.

DETAILED DESCRIPTION

The preferred embodiment including a glass according to the invention, as shown in FIG. 1, is a fibre. FIG. 1 shows a cross section of an optical fibre having a core region 12 and a cladding region 10. The core region 12 is surrounded by a cladding region 10 formed of a different glass composition which has a lower refractive index than the core region 12. The preferred cladding glass composition is pure silica, optionally containing melting point depressants such as phosphorus and fluorine. The glass of the cladding region 10 may also contain processing aids to facilitate drawing of optical fibres. The presence of, for example, phosphorus, fluorine and/or boron reduces the viscosity of the glass which makes it possible to work at lower temperatures. The concentration of processing aids in the cladding region 10 is not critical and may vary, provided the difference in refractive indices between the cladding region 10 and the core region 12 is sufficient to support waveguiding. The core region 12 includes thulium as a lasing species disposed in a host glass composition. The host glass composition includes oxides of tantalum, germanium and silicon. Oxides of tantalum, for example, increase the refractive index of the host glass composition and increase the fluorescence decay time of the thulium ions. The host glass composition also includes germanium, which, like tantalum, increases the refractive index of the host glass composition, but also decreases the attenuation of optical signals at the optical signal wavelength propagating in the glass, ie. The addition of germanium in low concentrations reduces the loss. The composition of the host glass will be further specified in the examples given below.

The laser length of the fibre is related to the available pump power and the concentration of thulium. A higher pump power enables a longer laser length to be used and lower thulium concentrations are also related to a longer laser length. For most purposes it is considered that laser lengths of 1 m–200 m, preferably 10 m–50 m, would be appropriate.

The invention also includes telecommunications systems which comprise an amplifier having an input and an output, as shown in FIG. 2, having the input and output fibres operatively coupled to input and output transmission fibre.

It will be appreciated that a telecommunications system is complicated. Its components are individually designed for the system's specific requirements. The dimensions of the fibre shown in FIG. 1, for use in a telecommunications system will be determined to a large extent by the fact that the amplifying fibre shown in FIG. 1 shall match, as closely as possible, the transmission properties of the transmission fibre.

This requirement indicates that the core of the amplifying fibre shown in FIG. 1 shall be of a similar size as the core of the transmission fibre. It is easy to appreciate that mis-matched core sizes will cause signals to be lost at either the input or the output end. It is also convenient that the external diameters be approximately the same, which implies that the claddings are the same. Matching the cladding sizes is however, less important than matching the core size. If single mode transmission fibre is chosen, the diameters of the fibre shown in FIG. 1 will match those of conventional single mode fibre. The dimensions of a single moded fibre will vary depending on the wavelength of the radiation transmitted. The fibre of the present invention is capable of amplifying radiation in a window at 1470 nm or in a window at 1620 nm. The wavelength range amplified by the window at 1470 nm is determined by the atomic structure of thulium ions, and corresponds to the energy difference between the $^3F_4$ energy band and the $^3H_4$ energy band. The wavelength range amplified by the window at 1620 nm is determined by the atomic structure of thulium ions, and corresponds to the energy difference between the $^3H_4$ and the $^3H_6$ energy bands.

For use with single mode transmission fibre, the fibre shown in FIG. 1 will typically have a core diameter of 5 to 10 micrometres, typically about 6–8 micrometres, i.e. slightly less than the diameter of transmission fibre, which is about 8 to 9 micrometres, and a cladding diameter of typically around 125 micrometres. The numerical aperture for the fibre shown in FIG. 1 is also compatible with that of single mode transmission fibre, and is typically 0.08 to 0.15, preferably around 0.10. The skilled person will understand that the precise dimensions of a particular fibre will depend on each particular application of that fibre, and also on each particular manufacturing process. The skilled person will also appreciate that experience acquired from the manufacture and application of erbium doped fibre amplifiers may in some respects be relevant to thulium doped fibre amplifiers.

If the fibre shown in FIG. 1 is for use with multimode transmission fibre, the dimensions are different. The core diameter is typically 30–100 micrometres, and the cladding diameter is typically 100 to 150 micrometres. The numerical aperture is typically 0.2 to 0.3.

Fibre as illustrated in FIG. 1 was prepared by a substantially conventional MCVD process.

One method of making optical fibre waveguides including glass according to the invention utilises the modified chemical vapour deposition process, usually identified as MCVD. MCVD is sometimes known as inside deposition process because the glasses which eventually form the operative part of the fibre are produced by converting the equivalent chlorides into the desired oxides which are deposited, layer by layer, on the inner surface of a substrate tube. Usually a total of 10–30 layers are deposited. As initially deposited, the glass is porous, but the porous material is immediately fused to give a solid layer upon which subsequent layers are deposited. When all the layers have been deposited the tube is collapsed into a rod which is drawn into a fibre. To make fibre this procedure is followed for the cladding region. The glass of the present invention is however left in the porous state. The thulium is introduced as a solution into the porous layers. After solvent removal, conversion to thulium oxide is necessary. The porous layer is consolidated and the tubular configuration is collapsed into a preform rod, which is then drawn into fibre. It should be noted that the introduction of additives by soaking the porous layers is a well-known modification of the MCVD process. Having been drawn into a fibre, the fibre is annealed before being coated with a protective coating.

Other Methods of Making the Fibre Include:

1) vapour axial deposition (VAD) technique whereby a porous boule of doped silica is fused into a thulium doped boule by fusing at approximately 1200–1400 degrees Celcius in an atmosphere of the thulium chloride. Alternatively, the boule can be soaked in an alcoholic solution as described in the MCVD technique above. The fused doped boule is surround by a cladding glass and drawn into fibre.

2) The outside vapour deposition (OVD) technique has also been reported to make thulium doped fibre. This is similar to the VAD process, but the thulium dopant is introduced into the boule during the deposition process from an organo-metallic source.

In the MCVD process a substrate tube was rotated in a glass blowing lathe while a reactant gas was passed through its bore. The thulium ions are incorporated into the host glass composition from solution. The thulium, tantalum and germanium precursors are diffused into an unsintered silica layer deposited by MCVD from an aqueous solution. Additional drying may be required to ensure contamination from hydroxyl groups is minimal but subsequent fibre drawing is conventional. Further, to compensate for the thermal shock experienced when a preform is drawn into a fibre, it may be necessary to anneal the fibre, subsequent to drawing, and prior to coating with a protective coating, of for example, plastic material. It has been found that annealing the drawn fibre reduces the loss. Preferably, the fibre is annealed at a temperature greater than about 900 degrees Celcius for about an hour. After annealing, the fibre is preferably given a protective plastic coating, as is conventional.

The concentration of thulium ions and tantalum is determined by the controlling the solution strengths of each precursor.

In preferred embodiments, it has been found that a glass having a concentration of silicon in the host composition between 15–25 weight percent, a concentration of germanium in the host composition is between 0.1–1 weight percent, a concentration of tantalum in the host composition is greater than 15 weight percent, or a concentration of thulium ions of approximately 500 to 1000 parts per million by weight provides a glass having a fluorescence decay lifetime sufficient to enable predominantly radiative emission to occur whilst not suffering from heavy loss, is achieved. In the host glass the above named elements are present as oxides, the balance in the composition being made up of oxygen.

As a comparison, a standard thulium doped Al/Ge preform, preform 208 was fabricated. Using the MCVD method described above, seven distinct tantalum germanium co-doped preform compositions were fabricated. The compositional details for these preforms are given in Table 1. Since there can be quite significant compositional variations along the length of a preform, preforms 223 and 224 fibres were pulled from both ends of the preform, end A and end B. These are labelled 223A, 223B, 224A, 224B.

The compositional analysis of the preforms detailed in Table 1 was carried out using two slightly different techniques: EDX (energy dispersive x-ray) and WDX (wavelength dispersive x-ray) type SEM. The latter technique is capable of better absolute accuracy and was therefore used to provide a series of comparison figures for preforms 208 and 209. The former EDX technique has good relative accuracy. Thus, the EDX technique was used to give compositional figures for the preforms 220, 222, 223, 224, 225 and 226, in relation to the known standard. The table includes the compositional weight % of silicon, germanium, aluminium and tantalum. The balance of the compositions of the preforms shown in Table 1 is made up of oxygen. Because the concentration of thulium is between 500–1000 ppm, the weight % contribution of thulium to the composition is very small. Thus, an approximate value for the oxygen weight % is found by taking away from 100 the sum weight % of the other constituents (silicon, germanium, aluminium and tantalum). Also, the weight % of the oxides of silicon, germanium, aluminium and tantalum may be calculated using their chemical formulae: $SiO_2$, $GeO_2$, $Al_2O_3$, $Ta_2O_5$.

TABLE 1

The compositional analysis of preforms

| Preform Identifier | Thulium conc. ppm | Composition Weight % | | | |
|---|---|---|---|---|---|
| | | Si | Ge | Al | Ta |
| 208[W] | 650 | 25.7 | 6.1 | 1.2 | — |
| 209[W] | 850 | 24.5 | 4.8 | — | 9.5 |
| 220 | Thulium conc. similar to 209 and determined by absorption in all cases | 27.5 | — | — | 20.4 |
| 222 | | 29.0 | — | — | 12.1 |
| 223A | | 23.7 | 0.6 | — | 15.7 |
| 223B | | 20.1 | 0.3 | — | 24.3 |
| 224A | | 25.2 | 2.5 | — | 10.6 |
| 224B | | 24.4 | 5.1 | — | 10.5 |
| 225 | | 27.3 | 0.0 | — | 14.7 |
| 226 | | 27.1 | 0.3 | 0.0 | 17.3 |

[W] indicates WDX technique used. Otherwise EDX used; Oxygen makes up the balance of the composition Data on the fluorescence spectrum and lifetime were collected by pumping a short length of fibre with a Ti:Sapphire laser at 775 nm, or a preform sample using a $Kr^{30}$ laser at 676 nm. In each case the sample was placed close to the entrance slit of a 0.25 m monochromator and emission was picked up, in a direction perpendicular to the direction of the pump source, by a GaAs PMT. For lifetime measurements the system was optimised to give a response time of 2–3 $\mu s$ using a Tek 7854 scope with 7A22 differential amplifier. The lifetime data was then downloaded to a personal computer for further analysis. Spectral data was recorded on a LeCroy digital scope before being downloaded to a personal computer.

It was found that fibre drawn from either preform 223A or 223B exhibited the increased fluorescence decay times and reduced loss.

FIG. 2 shows an amplifier using the fibre drawn from, for example, preform 223 as the amplifying medium 23. The amplifier includes an input port 21 fusion spliced to a length of amplifying medium 23 which is also linked, to output port 22. Both ports 21, 22 have silica glass cladding regions, and a thulium doped core disposed in a host glass composition including tantalum, silicon and germanium. A pump 26, which provides pump radiation at 787 nm, is optically coupled to link fibre 28 which forms a wavelength selective fused fibre coupler 30 with the input transmission fibre 21. The coupler 30 passes the pump radiation at 787 nm into the amplifying fibre 23 but it does not take out signals at 1470–1620 nm. When pumped with pump radiation of 787 nm, the thulium doped fibre amplifies optical signals in a window centred at 1470 nm and 1620 nm. The amplifier further includes a second pump 27, which provides pump radiation at 1064 nm, is optically coupled to link fibre 29 which forms a wavelength selective fused fibre coupler 31 with the input transmission fibre 21. The coupler 31 passes the pump radiation at 1064 nm into the amplifying fibre 23 but it does not take out signals at 1470 nm–1620 nm. When pumped with pump radiation of 1064 nm, the thulium doped fibre amplifies optical signals in a window centred at 1620 nm. The presence of two pumps makes the amplifier suitable for use in WDM systems.

Automatic gain control is preferably, achieved by the provision of a detector 25, which provides a feedback signal to pumps 26, 27 in accordance with the amplified signal detected in the output transmission fibre 22.

The effect of the tantalum, germanium, silicon concentrations is indicated by the observed fluorescent decay times and losses exhibited by the fabricated glasses, since it is the performance of the glass which is exploited in the fibre.

Many telecommunications networks use silica/germania fibre and, therefore, there is a requirement for laser fibre based on silica/germania to achieve compatibility with the transmission fibre in the rest of the network. As the glass composition of the invention is silica based, any integration problems are minimised.

FIG. 3 shows the energy level diagram for thulium. Thulium has been chosen as the lasing species in the glass of the present invention, because it provides transitions complementary to those of erbium. If the transitions, in thulium, for example, the 1470 nm transition from the $^3F_4$ manifold to the $^3H_4$ manifold and the 1620 nm transition from the $^3H_4$ to the $^3H_6$, ground state, are exploited. This allows a scheme for much wider wavelength coverage in WDM systems to be built up. When incorporating rare earth elements into silica fibre, there is a drawback, as silica glasses have a relatively large phonon energy, 1100 $cm^{-1}$. Thus only a few transitions have a sufficiently large energy gap to the next manifold to allow radiative emission to dominate over non-radiative emission. In erbium the gap between the ground and the first excited state is around 6600 $cm^{-1}$ (1530 nm), hence decay is dominated by radiative processes which leads to a metastable lifetime of 10 ms. In thulium, however, the gap from the ground to the first excited state is slightly smaller at 6100 $cm^{-1}$ (1620 nm), in this case the non-radiative decay rate is not negligible, thus the metastable lifetime is reduced to about 0.2–0.5 ms. The observed lifetime is a consequence of the exponential dependence on the energy gap of the non-radiative decay rate. The host glass composition of the present invention provides a microenvironment around the thulium $^{3+}$ ions of a lower phonon energy than a pure silica based host glass.

As mentioned previously, an investigation of the behaviour of the fibres pulled from these performs was carried out and reveals two important performance indicators: the background loss, and the fluorescence lifetime, in particular the fluorescence lifetime of the $^3F_4$ manifold. Some important conclusions could also be drawn from the various fluorescence spectra which were recorded, for each preform and fibre sample in the region of 800 nm. A summary of the lifetime data for the first series of four preforms is given in Table 2a and the corresponding data for the fibres is presented in Table 2b below.

It is noted that the decay of fluorescence from the $^3F_4$ manifold for both preform and fibre samples does not follow a single exponential. The reason for this is that glass has a very disordered structure which gives rise to variations in the electric field surrounding each active ion. This in turn means that there is a significant variation in the energy separation, $\Delta E$ value, between a pair of manifolds. For thulium in conventional silica, for example preform 208, the separation between the $^3F_4$ manifold and the $^3H_5$ manifold as determined by the absorption data is around 3700–4000 $cm^{-1}$.

TABLE 2a

The $^3F_4$ manifold fluorescence lifetime, τ, for preform samples

| Preform Identifier | Population % | | Fluorescence Lifetime μs | |
|---|---|---|---|---|
| | A site | B site | $\tau_A$ site | $\tau_B$ site |
| 208 | 73 | 27 | 25 | 85 |
| 209 | 68 | 32 | 75 | 350 |
| 220L | 30 | 70 | 150 | 740 |
| 220S | 55 | 45 | 120 | 740 |
| 222L | 54 | 46 | 100 | 600 |
| 222S | 66 | 34 | 80 | 540 |

(S short wavelength peak, L long wavelength peak)

Since the equation governing the non radiative decay rate $W_{NR}$, has exponential behaviour there will be large spread in the $W_{NR}$ values according to, $$W_{NR} = W_0 \exp(-\alpha\Delta E)$$

where $W_0$ and α are constants specific to the glass host. Thus for conventional thulium in silica, preform 208, the expected decay rate should be between 25 to 104 μs, which is close to the values observed, see Table 2a. In this case the overall radiative decay rate, $A_r$ is small in comparison to $W_{NR}$ and can therefore be neglected.

$$\tau = \frac{1}{\sum A_r + W_{NR}}$$

TABLE 2b

Background loss and the $^3F_4$ manifold fluorescence lifetime for fibres drawn from above performs

| Fibre type | Background Loss dB/m | Population % | | Fluorescence Lifetime μs | |
|---|---|---|---|---|---|
| | | A site | B site | $\tau_A$ site | $\tau_B$ site |
| 3208-01 | <0.05 | 80 | 20 | 20 | 80 |
| 3208-01H | NA | 67 | 33 | 25 | 85 |
| 3209-01 | <0.1 | 82 | 18 | 24 | 140 |
| 3209-01H | NA | 52 | 48 | 80 | 400 |
| 3209-05 | <0.1 | 79 | 21 | 25 | 140 |
| 3220-01 | 100 | 54 | 46 | 75 | 340 |
| 3222-01 | 7 | 70 | 30 | 25 | 170 |

(H indicates samples annealed at 1000 C. for 1 hour)

To simplify the analysis of the observed decay data a bi-exponential fit was used, see equation below.

$$I = A \exp(-t/\tau_A) + B \exp(-t/\tau_B)$$

leading to an A and B percentage population figure and two associated characteristic decay times τA and τB as listed in Tables 2a and 2b. Although this was only an approximation in most cases it did provide a good fit to the observed decay curve. It is further noted that there is a small but consistent shortening in the observed decay times between the a conventional thulium doped Al/Si silicate preform, as exemplified by preform 208 and the as drawn fibre drawn from a conventional preform, as exemplified by fibre 3208-01. This effect has been observed previously, J. R. Lincoln, W. S. Brocklesby, F. Cusso, J. E. Townsend and A. C. Tropper, "Time resolved and site selective spectroscopy of thulium doped into germano- and alumino-silicate optical fibre and performs", J. of Luminescence, Vol. 50, pp297–308, 1991, and can almost certainly be attributed to the rapid quenching of the glass during the fibre drawing process, which may modify the thulium distribution or its environment. To confirm this suggestion a number of fibre samples were taken and annealed in a furnace for 1 hour at 1000 degrees Celcius. The decay of the fluorescence was then re-measured. The results show, 3208-01H in Table 2b, that the fitted decay curve now has almost identical fitting parameters to the original curve from the preform.

Conventional thulium doped silica fibre, as exemplified by preform 208 and drawn fibres 3208-01 and 3208-01H, was compared with preforms including glass according to the present invention.

In preform 209, refer to Table 1, aluminium was replaced by tantalum. This resulted in two very noticeable changes, the background loss of the fibre increased by a factor of 2, and the fluorescence lifetime increased significantly in the preform. The improvement in the fluorescence lifetime was not carried forward into the drawn fibre, which shows only a marginal difference over the results from the conventional thulium doped silica sample. The change in the fluorescence lifetime in the preform tends to suggest the formation of a lower phonon energy environment has occurred. It is known for example, from W. S. Brocklesby, J. E. Townsend, D. J. B. Brinck, & R. S. Brown "Non-radiative Relaxation in Ta-doped Silica Fibre", Opt. Mats. Vol 3. pp205–208, 1994, that Raman spectra of the tantalum doped glass indicated a new peak at about 950 cm−1, similar to a germanate type glass.

If the same assumption is taken for the glass according to this invention, then the predicted non-radiative decay rate WNR, based on the previously quoted energy spread, is around 183–783 microseconds for a germanate type glass. Bearing in mind that these figures do not take account of the radiative contribution to the overall rate there is quite a good agreement with the observed decay rates. In addition, the decay rates observed in this work are a big improvement over those observed in W. S. Brocklesby, J. E. Townsend, D. J. B. Brinck & R. S. Brown "Non-radiative Relaxation in Ta-doped Silica Fibre", Opt. Mats. Vol. 3, pp205–208, 1994, which would tend to suggest a greater fraction of the germanate character has been incorporated into the final glass structure.

The inventors of the present invention, sought to investigate how much further the lifetime can be improved by incorporation of tantalum into the glass.

In one example, illustrate by preforms 220 and 222, which are shown by way of example only and do not fall within the scope of the claims, germainia was removed from the composition. These glasses demonstrated further improvements in the lifetime observed. Fluorescence lifetime experiments on these preforms 220 and 222 indicated that there are two specific sites for the active thulium ion to sit ion to sit in, and that they have quite separate characteristics. This was confirmed by the fluorescence decay measurements, which were taken on each of the peaks. The lifetime fitting parameters for the long wavelength peak show that for 220 the majority of the population has moved into the long lived state, with a lifetime of 750 μs, where as the shorter wavelength peak has a more even mix between the two states. This trend is repeated for 222 except the secondary peak now shows a dominant population fraction back in the shorter lived state.

The downside was that the fibres drawn from preforms 220 and 222 exhibited very high background losses, see Table 2b, and coupled with this, only the highest loss fibre actually showed signs of a significant enhancement in the characteristic lifetime fitting parameters.

TABLE 2c

Background loss and the $^3F_4$ manifold fluoresence lifetime for the remaining fibres

| Fibre type | Background Loss dB/m | Population % A site | B site | Fluorescence Lifetime μs A site | B site |
|---|---|---|---|---|---|
| 3223-01 | 4.0 | 68 | 32 | 120 | 530 |
| 3223-02 | <0.3 | 76 | 24 | 95 | 410 |
| 3224-02 | 0.1 | 66 | 34 | 20 | 80 |
| 3224-04 | 0.1 | 74 | 26 | 24 | 100 |
| 3225-01 | 0.25 | 62 | 38 | 30 | 150 |
| 3226-01 | <0.3 | 64 | 36 | 30 | 125 |

The inventors addressed the problem of fabricating a preform, from which a fibre can subsequently be drawn, that has an enhanced lifetime coupled with a reduced background loss, i.e a decrease in the attenuation of optical signals propagating in the medium, suitable for use as an optical amplifying medium in an amplifier. The lasing performance can be assessed by looking at the fluorescence lifetime and the loss, i.e. the attenuation. The results confirm that a thulium doped tantalosilicate fibre gives an improved fluorescence lifetime, but suffers from large loss. Adding tantalum to a glass increases the refractive index of the glass. If the refractive index is increased too much with respect to a cladding region, the waveguiding properties of a waveguide including tantalosilicate glass are compromised. However, the results confirm that most unexpectedly, when small amounts of germania, which also increases the refractive index, are added to a thulium doped tantalosilicate glass, the attenuation of optical signals, ie. the losses, in the glass are significantly reduced without the refractive index being significantly affected.

The results confirm that by introducing germania into a thulium doped tantalosilicate glass, preferably in a percentage weight of 0.1 to 1 percent, the fluroscence lifetime of the thulium is increased. This results in radiative decay dominating over non-radiative decay. Further, attenuation (losses) is decreased to a level where amplification of optical signals occurs.

It was found that introducing germania, in addition to tantalum and silicon into a thulium doped glass, within this range reduced the attenuation (loss). Further by increasing the tantalum concentration to within a range of 15–25 weight percent, the lifetime enhancement was increased in the drawn fibres. The level of control of the MCVD solution concentration required to achieve requires control. It is complicated by the fact that germania tends to wash itself and the tantalum solution out in the process. Four further preforms and more than six further fibres were fabricated, refer to Table 2c. Because of the compositional variation along the length of the preform it was possible to draw two completely different fibres one from each end of the preform. (A and B in Table 1 indicate the compositional make up of either end of the same preform).

As an aid to visualising the necessary compositional balance in the preforms/fibres between germanium and tantalum concentrations FIG. 4 was plotted. The compositional information for these fibres is given in Table 1 above, and the observed background loss and lifetime information is given in Table 2c. As one can see from the above table the fibres made from preform 223 exhibit enhanced fluorescence lifetime and low background loss figure, suitable for use in an amplifier.

It is noted that the higher loss fibre has by far the best lifetime characteristics, but for this reason can be ruled out. It can be seen from FIG. 4 that to obtain a low loss fibre the germania concentration should preferably be below 1% and for a lifetime enhancement in the fibre a tantalum concentration above 15% is preferred.

The incorporation of tantalum into a standard thulium doped silica fibre composition appears to provide a new micro-environment, with a typical phonon energy of 950 cm$^{-1}$, around a compositionally adjustable fraction of the optically active rare-earth ion. This has particularly beneficial charactersitics for the $^3F_4$ manifold in thulium because the new micro-environment pushes the balance of emission from entirely non-radiative effects in silica over towards a balance between radiative and non-radiative effects.

The glass of the present invention exhibits increased fluroescence decay times and decreased attenuation of optical signals. The problem of the rapid thermal shock, which occurs when the preform glass is drawn into a fibre, was identified. Further, the thermal history of the fibre seems to have a significant bearing on the emission decay. This problem was overcome, for example, a sample of fibre 3209-01H was annealed at 1000 degrees Celcius for 1 hour and then slowly cooled to room temperature. The fluorescence decay was then re-measured, see Table 2b, and the curve fitted in the usual manner. The fitting parameters required were, if anything, a slight improvement over those used for the preform. It was found that annealing for about 1 hour at 1200 degree Celcius also works well, but results in a fibre which is more delicate than that annealed at 1000 degrees Celcius. It was found that annealing at 800 degrees Celcius for 1 hour did not improve the lifetime characteristics of the drawn fibre with respect to the preform. Preferably, the fibre is drawn at a temperature greater than about 900 degrees Celcius.

What is claimed is:

1. A silica glass composition capable of supporting lasing activity at a signal wavelength, said composition comprising:
    a lasing species in a host glass, wherein the lasing species is Tm$^{3+}$ ions and the host glass consists essentially of silica, germania to decrease the optical attenuation in the glass composition at the signal wavelength and tantalum oxide to stabilize an excited state of the Tm$^{3+}$ ions.

2. A glass according to claim 1, wherein the concentration of thulium ions in the host glass is between 500–1000 parts per million by weight.

3. A glass according to claim 1, wherein the concentration of silicon in the host composition is between 15–25 weight percent.

4. A glass according to claim 1, wherein the concentration of germanium in the host composition is between 0.1–1 weight percent.

5. A glass according to claim 1, wherein the concentration of tantalum in the host composition is greater than 15 weight percent.

6. A glass according to claim 1, wherein the lasing activity is supported at a signal wavelength of either 1470 nm or 1620 nm.

7. An optical waveguide for use in an optical amplifier, said waveguide comprising:
    a cladding formed of a cladding glass having a refractive index of n1;
    a core having a refractive index of n2, where n2 is greater than n1;
    said cladding surrounding said core, wherein said core is formed of a glass according to claim 1.

8. An optical waveguide according to claim 7, wherein the waveguide is an optical fibre.

9. An optical waveguide according to claim 7, wherein said cladding glass is silica or silica and one or more processing aids, said processing aids including boron, phosphorus or fluorine.

10. An optical amplifier comprising:
   a lasing medium which contains thulium ions as a lasing species;
   an input port for launching optical signals for amplification into said lasing medium; and
   one or more pumps for providing pump radiation adapted to produce a population inversion in the lasing species, wherein the lasing medium is an optical silica glass consisting essentially of silica, germania to decrease the optical attentuation in the glass composition at the wavelength of the optical signals and tantalum oxide to stabilize and excited state of the $Tm^{3+}$ ions, said silica, germania and tantalum oxide being a host for the lasing species.

11. An optical amplifier according to claim 10, wherein the pump or one of the pumps provides pump radiation in the range of either 780 nm to 810 nm or 1050 to 1070 nm.

12. An optical amplifier according to claim 10, comprising two pumps, wherein one pump provides pump radiation in the range 780 nm to 810 nm and the other pump provides pump radiation in the range 1050 nm to 1070 nm.

13. An optical amplifier according to claim 10, wherein said optical silica glass is the core of an optical fibre.

14. A system including an optical amplifier according to claim 10, wherein the pump provides pump radiation in such a way to provide amplification of optical signals at 1470 nm.

15. A system according to claim 14, wherein the amplification at 1470 nm corresponds to the energy difference in a thulium ion between a $^3F_4$ energy band and a $^3H_4$ energy band.

16. A system including an optical amplifier according to claim 10, wherein the pump provides pump radiation in such a way to provide amplification of optical signals at 1620 nm.

17. A system according to claim 16, wherein the amplification at 1620 nm corresponds to the energy difference in a thulium ion between a $^3H_4$ energy band and a $^3H_6$ energy band.

18. A method of amplifying optical signals, comprising:
   launching said optical signals into an amplifying silica based medium consisting essentially of thulium ions as a lasing species and silica, germania to decrease the optical attenuation in the glass composition at the wavelength of the optical signals and tantalum oxide to stabilize an excited state of the $Tm^{3+}$ ions, said silica, germania and tantalum oxide being a host for the lasing species; and
   simultaneously launching pump radiation into said lasing medium, so that photons of said pump radiation are absorbed by the $Tm^{3+}$ ions to produce a population inversion which sustains stimulated emission of signal photons so as to amplify said optical signals.

19. A method of amplifying optical signals according to claim 18, wherein said pump radiation is either in the range of 780 nm to 810 nm or in the range of 1050 nm–1070 nm, or is in both of said ranges.

20. A method according to claim 18, wherein the optical signals have a wavelength close to 1470 nm or close to 1620 nm or both 1470 nm and 1620 nm.

21. A method according to claim 20, wherein said optical signals are wavelength division multiplexed.

22. The use for amplifying optical signals of a silica glass consisting essentially of thulium ions as a lasing species and silica, germania to decrease the optical attenuation in the glass composition at the wavelength of the optical signals and tantalum oxide to stabilize an excited state of the $Tm^{3+}$ ions, said silica, germania and tantalum oxide, being a host for the lasing species.

23. A method of amplifying optical signals, comprising:
   launching said optical signals into an amplifying silica based medium consisting essentially of thulium ions as a lasing species and silica, germania to decrease the optical attenuation in the glass composition at the wavelength of the optical signals and tantalum oxide to stabilize an excited state of the $Tm^{3+}$ ions, said silica, germania and tantalum oxide being a host for the lasing species; and
   simultaneously launching pump radiation into said lasing medium, so that photons of said pump radiation are absorbed by the $Tm^{3+}$ ions to produce a population inversion which sustains stimulated emission of signal photons so as to amplify said optical signals, wherein said optical signals are wavelength division multiplexed.

24. The method according to claim 23, wherein said wavelength division multiplex includes wavelengths close to 1470 nm and close to 1620 nm, wherein wavelengths close to both 1470 nm and 1620 nm are present together to form the multiplex.

25. The method according to claim 23, wherein two pumps are used simultaneously in the range of 780 nm to 810 nm and in the range of 1050 nm to 1070 nm.

26. A silica glass core composition capable of supporting lasing activity at a signal wavelength, said composition comprising:
   a lasing species in a host core glass, wherein the lasing species is $Tm^{3+}$ ions and the host core glass consists essentially of silica, germania to decrease the optical attenuation in the core glass composition at the signal wavelength and tantalum oxide to stabilize an excited state of the $Tm^{3+}$ ions.

* * * * *